Feb. 10, 1948.    J. L. LAWSON    2,435,788
CONTROL OF REFLECTIONS IN TRANSMISSION LINES
Filed Dec. 7, 1942

JAMES L. LAWSON
INVENTOR

BY

ATTORNEY

Patented Feb. 10, 1948

2,435,788

UNITED STATES PATENT OFFICE 2,435,788

CONTROL OF REFLECTIONS IN TRANSMISSION LINES

James L. Lawson, Ann Arbor, Mich., assignor to the United States of America, as represented by the Secretary of the Navy Application December 7, 1942, Serial No. 468,137

18 Claims. (Cl. 178—44)

This invention relates to transmission lines in which supports of insulating material are provided at spaced points for maintaining the position of one or more conductors. In particular this invention concerns transmission lines in which such insulating supports are relatively few per wave length of transmission line, that is to say, less than about 10 per wave length.

In the operation of transmission lines at very short wave lengths it is often desirable to employ transmission lines having relatively few support insulators per wave length because the introduction of insulators in addition to those necessary for mechanical support increases the loss occurring in the line. Previous to this invention, however, the attempted use of transmission lines having relatively few insulating supports per wave length resulted in great difficulties, because such lines possessed in many cases rather considerable energy reflections in the line, and because the input impedances of such lines varied rather widely among different lines not greatly differing in construction. Such lines, moreover, showed considerable change of impedance with frequency. It is an object of this invention to provide a transmission line of a type which will operate without undesired energy reflection or reactive effects even though the supporting insulators of the line may be few in number per wave lengths of line. It is a further object of this invention to provide a transmission line having relatively few insulating supports per wave length exhibiting desirable transmission characteristics at a particular design wave length and in addition possessing desirable characteristics at wave lengths differing somewhat from such design wave lengths in order that small changes in wave length will not greatly affect the transmission characteristics of the line.

Transmission lines requiring insulating spacers used for the very short wave lengths at which this invention has its main importance are usually transmission lines of the coaxial conductor type and the invention will therefore be illustrated and explained entirely with reference to coaxial conductor transmission lines, although it is understood that the principles of the invention are also applicable to other types of transmission line using spaced insulating supports, such for instance as parallel wire transmission lines. In its broader aspects the invention also has some applicability to other discontinuities in transmission lines which recur at spaced points such, for instance, as supporting stubs used in stub-supported transmission line, which stubs may present a slight discontinuity in the line in spite of the efforts that may be taken to adjust the dimensions of the stub so that no reflections of energy will occur where it is connected to the line. Since insulating supports are the most common type of recurrent similar discontinuities in transmission lines and since the arrangement of the insulating support presents the most pressing problem with which the invention is concerned, the invention will be explained with reference to the spacing of insulating supports in a transmission line.

The invention may best be explained with reference to the drawings in which.

Figure 1:
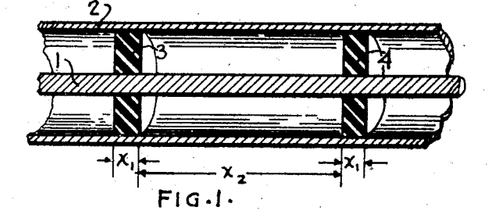
Fig. 1 is a cross section of a coaxial conductor transmission line showing two insulating spacers.

Fig. 1 shows a short section of transmission line having an inner conductor 1 and an outer conductor 2 between which are located insulating spacers of the type generally known as beads, which are shown at 3 and 4. The thickness of the beads is represented by the dimension $x_1$ and the spacing between opposite bead spaces of successive beads is represented by the dimension $x_2$. The dielectric constants of the insulating material of which the beads 3 and 4 are constituted will of course be somewhat greater than the dielectric constant of air, so that the characteristic impedance of the short section of transmission line which is constituted by that part of the transmission line which embraces the insulating bead will be less than the characteristic impedance of the sections of transmission line between successive beads. Thus the entire transmission line structure may be considered as a transmission line into which has been interposed at intervals short sections of transmission line of a different characteristic impedance. The interposition of these discontinuities will cause reflections to arise, which is to say that standing waves will occur in the transmission line which will usually vary the input impedance and will also be accompanied by an increased attenuation along the line.

To be exact, one reflection will occur at each surface of each bead, so that the resultant reflection effect will vary with the thickness of the bead as well as with the dielectric constant of its constituent material. It is not necessary to pursue further the analysis of the disturbance set up by a single bead, except in cases where it is desired to consider systems in which the insulating spacers are of unequal thickness or configuration. Such analysis, moreover, is but a simple application of well-known transmission line calculation. It is sufficient for the ordinary type of transmission line in which all the insulating spacers are essentially similar to consider each insulator as setting up a single resultant disturbance consisting essentially of a reflection of some of the incident energy setting up a standing wave, the amount of reflection and consequently the amplitude of the standing wave being determined by the dielectric constant of the material of which the bead is made and also by the thickness of the bead. When there are a number of beads in a transmission line, each will set up such a disturbance, and since the beads will be at different places along the line the phases of the different standing waves set up can be expected to vary. It will therefore be seen that a certain spacing can be obtained at which the standing waves set up by two different beads, such as the beads 3 and 4 in Fig. 1, will be in phase opposition and will therefore cancel, thus promoting transmission of energy along the transmission line without the production of standing waves. By the use of transmission line calculations I have derived a formula for the spacing of two insulating beads forming a pair of beads in such a manner that at a desired wave length the reflections arising at the two beads will cancel and the pair of beads will present a minimum or zero disturbance to transmission of energy of such wave lengths along the line. In order that the formula I have derived may be clear in its meaning, some of its terms should first be defined with reference to Fig. 1.

As electromagnetic oscillatory energy proceeds along the transmission line, the phase of the oscillations is of course changing, so that at any given moment there will be a progressive change of phase with position along the lines and of course all points of the line will exhibit a progressive change of phase with time. The progressive change of phase along the line at any given instant will vary with the dielectric constant, so that a greater phase shift per unit length will occur in the sections of line embracing the insulating beads than in the intervening sections of line. The angular phase shift $\alpha_1$ for the length $x_1$ where the insulating bead is located is given by the formula $$\alpha_1 = \frac{2\pi}{\lambda} x_1 \sqrt{\epsilon} \text{ (radians)}$$

$$= \frac{360}{\lambda} x_1 \sqrt{\epsilon} \text{ (degrees)}$$

the corresponding formula for the phase shift $\alpha_2$ occurring in the line between insulators, where the length of such section of line is $x_2$, is given by the formula $$\alpha_2 = \frac{2\pi}{\lambda} x_2 \text{ (radians)}$$

$$= \frac{360}{\lambda} x_2 \text{ (degrees)}$$

The relation which I have derived which determines the spacing between the components of a pair of insulating beads for the cancellation of reflection and standing waves is the following:

$$\tan \alpha_1 \tan \alpha_2 = \frac{2\sqrt{\epsilon}}{1+\epsilon}$$

In the above formula $\epsilon$ represents the dielectric constant, in accordance with the usual notation. From the above formulae the spacing $x_2$ can be calculated when the bead thickness $x_1$ and the dielectric constant of the material of the bead is given. The formulae apply of course to beads of similar dielectric constant and configuration, further calculation being necessary in case the beads are dissimilar. In practice, similar beads are almost always used. Even if for some reason it might be desired to use larger beads at one point of the line, for instance, the beads could easily be arranged in pairs of similar beads, each pair being spaced according to the above formula.

Examination of the formula expressing the condition for cancellation of reflections from the components of a pair of beads will show that where the bead thickness $x_1$ is very small, and $\alpha_1$ is consequently also small, the value of the sum of $\alpha_1$ and $\alpha_2$ will approach an odd multiple of 90°, which is to say that the spacing between corresponding spaces of the beads of a pair constituted in the fashion above outlined will be an electrical quarter wave length. The term electrical quarter wave length as just used defines a length somewhat shorter than one quarter of the wave length in air or in air-insulated line, on account of the effects of the dielectric constant of the insulating bead. In the formulae of course the term $\lambda$ refers to the free space wave length.

When the beads are more than a few per cent of the wave lengths in thickness (referring again to the free space wave lengths) the approximation that $$\alpha_1 + \alpha_2 = (2n+1)\frac{\pi}{4}$$

$n$ being any integer, is preferably not used, since better results are obtainable by calculation using the formula involving the tangent product. The use of that formula and also the extent to which results obtained from it differ from those obtained from the aforementioned approximation in the case of beads having dimensions such as those in common use will readily be seen from the following illustration.

Suppose, for example, that the insulating beads are made of polystyrene having a dielectric constant equal to 2.6 and that each bead has a thickness of 3 per cent of the wave length in air. In this case the formulae determining the spacing will reduce to $$\tan \alpha_1 \tan \alpha_2 = .896$$

$$\alpha_1 = \frac{360}{\lambda}(.03\lambda)\sqrt{2.6} = 17.4°$$

and the quantities will be defined as follows:

$\alpha_1 = 17.4°$
$\alpha_2 = 70.8°$
$x_2 = .20\lambda$
$x_1 + x_2 = .23\lambda$ These calculations, being purely illustrative, have not been carried out to many decimal places. It will be noted that the sum of $\alpha_1$ and $\alpha_2$ is in this case 88.2°, which shows to what extent the calculations carried out in this fashion differ from those carried out on the basis of the assumption that $\alpha_1 + \alpha_2 = 90°$. (For simplicity, spacing in the neighborhood of 270°, 450°, and so on, has been left out of consideration, though of course such cases follow similar rules.) With bead thicknesses somewhat greater in terms of wave length the difference between 90° and the sum of $\alpha_1$ and $\alpha_2$ will show further increase.

Figure 2:
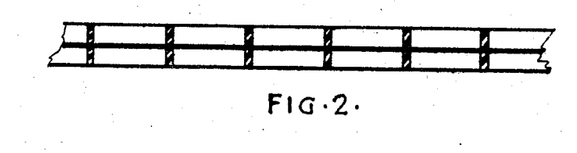
Fig. 2 is a cross section on a reduced scale showing a somewhat longer section of transmission line in which the insulating spacers are regularly spaced.

Where, as in the usual case, the transmission line includes more than two supporting insulators, additional complications are met. If the insulators are arranged in the line as shown in Fig. 2, where they are uniformly spaced from each other, and if the spacing is then determined as above outlined in order that the reflection from any pair of insulators will cancel out, although the line might behave reasonably well at the exact frequency for which the spacing has been designed to cancel out reflections and standing waves, the behavior of the line will be extremely critical with respect to changes in frequency. In practice it is usually desired that the characteristics of the line should remain approximately the same for a small region of frequencies in the neighborhood of the design frequency. In order that such a condition may be obtained further arrangements in the spacing of the insulators are desirable.

Figure 3:
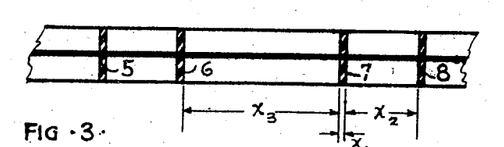
Fig. 3 is a cross section of a short length of transmission line with insulating support spaced in accordance with this invention.

Fig. 3 shows in a simple form the arrangement I have devised for obtaining practical cancellation of reflections in a multi-insulator line without excessive sharpness of the frequency characteristic. In Fig. 3 are shown two pairs of insulating beads 5, 6 and 7, 8 in a coaxial transmission line. The components of each bead pair are spaced in accordance with the formula above indicated, as shown by the dimensions on Fig. 3 relating to the pair of beads 7, 8. In addition the centers of the respective pairs of beads are spaced from each other in accordance with the same principles used in determining the spacing between individual beads. The spacing of pairs of insulators from other pairs according to these principles is in effect a second order correction, so that for this purpose sufficiently accurate spacing can be obtained with the assumption that $\alpha_1 + \alpha_2 = 90°$ which, as mentioned before, is sufficiently accurate even for the spacing of components of a pair when the insulators are thin. For the purpose of spacing pairs from other pairs, this assumption is sufficiently accurate for good results for insulators of any reasonable thickness. With this assumption, the spacing of the centers of a pair from the center of another pair reduces to the problem of making the total phase shift angle between such centers an odd multiple of 90°.

When the spacing between the centers of the pairs 5, 6 and 7, 8 is thus determined, the distance between adjacent insulating beads of successive pairs, shown on Fig. 3 by the dimension $x_3$, becomes exactly one quarter wave length greater than the distance $x_2$ which separates the components of the insulator pairs. It will be noted that as $x_1$, the bead thickness, becomes small, and $\alpha_1 + \alpha_2$ as above noted approaches 90°, $\alpha_1 + \alpha_3$ ($\alpha_3$ being the phase shift corresponding to the length of line $x_3$) will approach 180°. Thus while $x_1 + x_2$ is equal to slightly less than a quarter wave length, $x_1 + x_3$ is equal to slightly less than a half wave length. In the above given example $x_3$ would equal $0.48\alpha$.

The operation of the arrangement of beads shown in Fig. 3 is believed to be as follows. If because of a slight difference between the frequency of operation and the design frequency of the line there is a slight resultant reflection from the bead pair 5, 6, such reflection will be practically cancelled out and in any event greatly reduced, by the opposing reflection set up by the similar pair of beads 7, 8. The degree to which such resultant reflections will in fact cancel may be expected to increase with decreasing difference between the frequency of operation and the design frequency of the line.

The spacing of insulator pairs as just described is also useful in minimizing reflections or standing waves resulting from failure of the spacing within pairs to cancel completely the disturbances set up by the individual insulators even at the design frequency. Such failure of complete cancellation might arise from a change of the dielectric constant of the insulating material on account of humidity or temperature or it might occur for other reasons.

Figure 4:
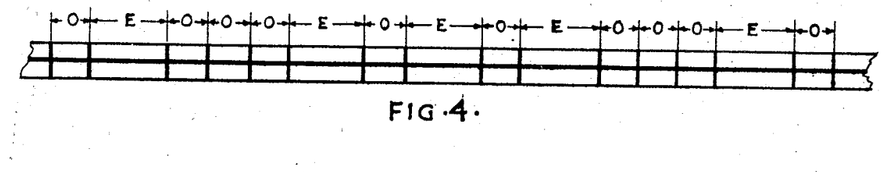
Fig. 4 is a cross section of a somewhat longer length of transmission line illustrating the positioning of insulating supports according to this invention.

This principle of spacing groups of beads so that the resultant reflection from such groups may cancel, in the same fashion as it is desired that the reflections from components of a bead pair will cancel, may be carried further to groups of any size constituted according to the foregoing principle. Thus two groups of beads, each of which group is constituted according to the spacing shown in Fig. 3 (i. e., 4 beads in each group) could be spaced in a line with their respective centers separated by the smallest practical number of electrical quarter wave lengths, in this case five-fourths wave lengths (phase angle close to 450°), in which case it works out that the distance between adjacent beads of the two different four-bead groups will be the same as the distance $x_2$ in Fig. 3. Fig. 4 shows an arrangement of 16 insulating beads in a transmission line in accordance with the foregoing principle. In this case two groups of 8 beads are arranged with their centers approximately eleven-fourths wave lengths apart, each group of 8 beads being constituted of 4 groups of 2 beads with their respective centers separated by a distance of approximately five-fourths wave lengths and each group of 4 beads being constituted by 2 pairs of beads with their respective centers separated by a distance roughly equal to three-fourths wave lengths. It will be seen from Fig. 4 that the development of larger and larger groups of similar beads according to these principles will result in the spacings between successive beads having always one of two particular values. The symbol O represents the dimension shown on Figs. 1 and 3 by $x_2$, while the symbol E represents the dimension $x_3$ of Fig. 3. The scale of the drawing is such that the dimension $x_1$ has been neglected. It should be taken into account as above described in spacing the insulators, either through the approximation $d_1 + d_2 = 90°$, 270° etc., or the more accurate formula given above.

Figure 5:
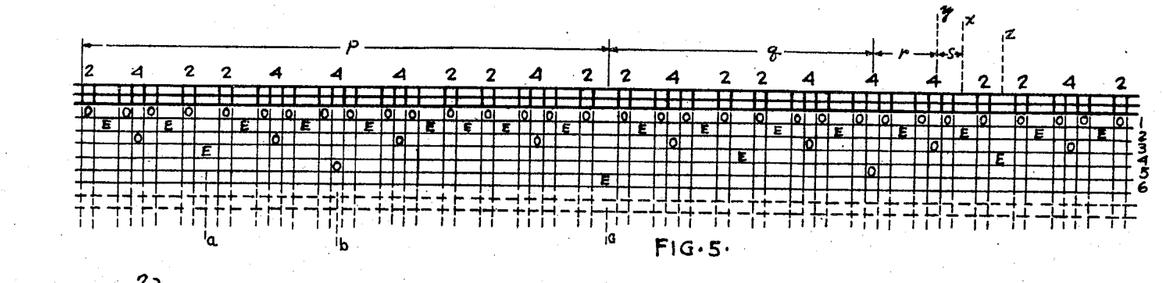
Fig. 5 is a diagrammatic cross section on a very much reduced scale of an even longer length of transmission line for the purpose of illustrating the general system of spacing insulating supports in a transmission line according to this invention.

Fig. 5 shows an arrangement of 64 beads in a transmission line in accordance with the foregoing principle. In order to show how the spacings between successive beads may be rapidly determined, these spacings are shown in a pattern below the diagrammatic representation of the transmission line. On the uppermost line of this pattern appear the symbols indicating the length of spacing between the individual components of the bead pairs which are intended to function as couplets in accordance with the principles outlined in connection with Fig. 1. Such a pair may be referred to conveniently as a first order group. On the second line in the pattern appear symbols indicating the spacings between certain beads which spacings are determined by the spacing of said couplets into groups of 4 beads functioning in accordance with the principles described in connection with Fig. 3. Such groups of 4 beads may be referred to conveniently as second order groups. On the third line of the pattern appear symbols indicating the spacing between certain successive beads which spacings are determined by the pairing off of groups of 4 beads to form groups of 8 beads, which latter groups may be conveniently referred to as third order groups. The fourth, fifth and sixth lines of the pattern show spacings determined by fourth, fifth and sixth order groupings in the same fashion. The symbol O as in Fig. 4 refers to spacing corresponding to the dimension $x_2$ in Fig. 3 and the symbol E, also as in Fig. 4, refers to spacing corresponding to the dimension $x_3$ in Fig. 3. It will be noted that the spacings determined by second order grouping, i. e., the spacings between the ends of first order groups, is always given by the dimension E, whereas the spacings determined by odd order grouping, which is also the spacings between adjacent ends of even order subgroups, is always given by the dimension O. The entire pattern as developed in Fig. 5 is symmetrical about the center.

The balancing of groups 4, 8, 16 and so on beads against each other in accordance with the principles herein outlined will be seen to result in a spacing between centers of two groups which form a balanced group of the next higher order equal to an even multiple of the distance $(x_2+x_1)$ plus an odd number of quarter wave lengths. The additional quarter wave lengths are brought into the expression for the distance between group centers on account of the $x_3$ spacings occurring within the component groups. Thus the spacing between the center of two couplets (first order groups) which form a second order balanced group (4 beads) is $$2(x_1+x_2)+\frac{\lambda}{4}$$

The spacing between the centers of second order groups (4 beads each) which form a third order balanced group (8 beads) is expressed by $$4(x_1+x_2)+\frac{\lambda}{4}$$

Corresponding spacings for certain higher orders will be seen to be as follows:

Table

| Order of major component groups | No. of beads in comp. groups | Spacing between centers of component groups |
|---|---|---|
| 3 | 8 | $8(x_1+x_2)+\frac{3\lambda}{4}$ |
| 4 | 16 | $16(x_1+x_2)+\frac{5\lambda}{4}$ |
| 5 | 32 | $32(x_1+x_2)+\frac{11\lambda}{4}$ |

It will be seen that the spacing between balanced group centers for the purpose of forming a balanced group of a higher order may be expressed as $$n(x_1+x_2)\frac{m\lambda}{4}$$

where $n$ is the number of insulators in each of the groups the spacing between the centers of which is to be determined, and $m$ is an odd integer sufficiently large to prevent the said groups of insulators from overlapping.

The quantity $\lambda$ to which the various calculations in accordance with this invention are referred may be defined as the wave length in air of the oscillations in question (i. e., those of a frequency for which the transmission line is designed to have its optimum characteristics), the wave length in a coaxial transmission line in which there is no insulation other than air being the same as the wave length of radiation in the open air.

Where the structures producing discontinuities in the line are not simply insulators but are other forms of structures or support forming reflections or standing waves which it is desired to eliminate, the formula for pairing off such structures or supports in order to cause reflections to cancel out as much as possible should be expressed in the more general form:

$$\tan \alpha_1 \tan \alpha_2 = \frac{2Z_1Z_0}{Z_1^2+Z_0^2}$$

This is essentially the same formula as that previously given but it defines the tangent product in terms of the characteristic impedances of the two kinds of sections of the line. The previously given formula will be seen to be a special case of the one just given in view of the fact that the formula first given refers to a line of constant conductor dimensions where the only change causing the discontinuity is the introduction of a dielectric supporting bead, so that the change in characteristic impedance can be expressed entirely in terms of the dielectric constant (that of air being 1). In the form of the formula just given, $Z_1$ represents the characteristic or surge impedance of the sections of the line within the structure creating the discontinuity, while $Z_0$ represents the characteristic or surge impedance of the sections of line making up the rest of the transmission line. $\alpha_1$ and $\alpha_2$ as before represent the phase shift or electrical length respectively of the sections of line within the discontinuity producing structures and the sections of line between said structures. The relation of $\alpha_2$ to the physical length of the corresponding section of line remains the same as before. In the definition of $\alpha_1$ the square root of the dielectric constant should be replaced by the more general expression $$\frac{Z_1}{Z_0}$$

The two expressions are equivalent where the only change in characteristic impedance is that caused by the introduction of dielectric.

The more general formula just discussed is also convenient for use in transmission lines structure where a change in the dimensions of the conductors of the line takes place at the places where an insulating support is arranged across the line. Once the characteristic impedances of the various parts of the line have been calculated in the usual manner, or experimentally determined, the arrangement of a large number of such structures or supports having mutually similar configurations and electrical characteristics can be carried out in accordance with this invention as easily and simply as the distribution of insulators in a transmission line as above described.

It will be seen from the description of Fig. 5 that a maximum balancing effect with a given number of beads can be achieved in this fashion with total bead numbers of 2, 4, 8, 16, 32, 64, 128, 256 and so on. For practical purposes, however, it is often desirable to provide lines having a total bead count different from the foregoing most desired numbers. Where the design of the apparatus in question permits some adjustment of the line length it is desirable to adjust the line length so that the number of beads will be a multiple of the highest possible power of 2, which means that the beads will be grouped as much as possible in the larger type of balanced groups. The line should not be so cut as to result in its possessing an odd number of beads, since the odd bead in the ordinary case could be expected to set up uncompensated reflections. A line constructed as herein described will have a characteristic impedance substantially constant over a range of frequencies, and in fact this characteristic impedance will be substantially that which would be expected in the absence of all the supporting insulators. These advantageous properties are not obtainable with an odd number of supporting insulators in the line. A line constructed according to the foregoing principles, and, for instance, being constructed such as that of Fig. 5, may be cut without great loss of balancing effect at some point between different first order couplets, such for instance as at the points $x$ or $y$ shown on Fig. 5. As mentioned before, the greater degree of balance is to be obtained when the total number of beads is a multiple of a relatively higher power of 2. Indeed if the line is cut at the points $a$, $b$ or $G$, the portion to the left of the cut will have a maximum degree of balance, the bead arrangement being symmetrical about the middle. In general, except for special cases to be ascertained with care, if the line is to be cut a certain amount, greater balance can be obtained by cutting it from one end only rather than by trimming both ends.

If the line of Fig. 5 is cut off at $x$, for instance, it will then include a balanced group of 32 beads covering the length indicated on Fig. 5 at $p$, a balanced group of 16 beads occupying the space indicated by $q$, a group of 4 beads occupying the space $r$ and a couplet occupying the space $s$. As previously indicated greater balance could be obtained by eliminating the odd couplet $s$ and cutting the line at $y$, and even greater balance could be obtained by adding another properly spaced couplet and cutting the line at $z$ so that the 4-bead group $r$ is balanced by an additional 4-bead group. But for many purposes a line cut as indicated at $x$ might have quite acceptable transmission characteristics. If a line such as that of Fig. 5 but cut at the point $x$ is to be used, it is to be noted that the spacing between the groups of beads which are not balanced by other groups of beads is no longer material. In other words the spacing between the couplet $s$ and the group $r$ could be varied, and likewise the spacing between the groups $p$ and $q$ and between the groups $q$ and $r$. For purpose of practical manufacture, however, it will be convenient to construct lines according to a fixed pattern which is more or less independent of line length, without attempting to compensate for the presence of couplets or other groups which are not balanced by a similar group paired with them through further adjustment of the spacing between such groups and the other groups of beads in the line.

Because of the fact noted above that the characteristic impedance of a line constructed in accordance with the present invention is substantially the same as if the line were without insulators, insulators may be omitted at the ends of the line to provide a more favorable number and grouping of the remaining insulators. For instance, if it should be desired to obtain a length of the line of Fig. 5 of such length as would under the scheme of Fig. 5 contain an odd number of insulators, the unpaired insulator on the end of the line could simply be removed or omitted. Removal of insulators in this fashion to obtain better insulator grouping will not disturb the impedance match at the ends of the line.

A further consideration in the grouping of insulators lies in the circumstance that when the attenuation within a length of line occupied by a balanced group of insulators as above-described is greater than about three decibels, there is little or no advantage to be gained by any particular adjustment of the spacing between the center of such a group and the center of another balanced group (since the attenuation would then be sufficient to prevent any effective degree of cancellation of residual reflections). This consideration provides a limit beyond which it is normally not useful to carry out the principles of this invention.

For the purpose of ready notation for systems of beads according to the foregoing principles, patterns such as those made up of the symbols O and E appearing in Fig. 5 may be rather cumbersome, particularly after the desired bead configuration has been drawn up and it is only a question of giving manufacturing instructions for the construction of a transmission line according to the prearranged design. Since in the arrangements of beads shown in Figs. 3, 4 and 5 only two different spacings occur between successive beads, as above-mentioned, the arrangements of the beads in the line may be denoted by indicating the number of beads in a group in which successive beads are separated by the narrower spacing. It will be seen from Fig. 5 that when considered in this way, the beads appear to fall in groups of 2 or 4 beads only, each group being separated by the larger spacings, the beads within the group being separated by the smaller spacings. The numbers appearing above the diagram of the transmission line of Fig. 5 indicate how the spacing of the insulating beads in the line may be designated by a series of numbers representing group size.

The representations of coaxial lines in the drawings are diagrammatic in nature. It is understood that the ratio of the inner diameter of the outer conductor, which is usually called $b$, to the outer diameter of the inner conductor, usually called $a$, is ordinarily chosen in order to provide a desired characteristic line impedance in accordance to the well-known formula:

$$Z = 138 \log_{10} \frac{b}{a}$$

With a given $$\frac{b}{a}$$

ratio, the absolute dimensions of $b$ and $a$ are usually chosen with regard to the voltage rating desired, larger dimensions being desirable for the higher voltages in order to prevent undesired breakdown, while for lower voltage applications lines of relatively smaller diameter are usually satisfactory.

In ordinary practice the spacing insulators used in coaxial conductor transmission lines have parallel plane faces perpendicular to the axis of the line. If insulators of other configurations are employed the effective thickness of an equivalent parallel plane disk insulator should be calculated before the above formulae are applied. Small deviations from the parallel plane shape may, however, be neglected.

Slight changes in the dimension noted on Fig. 3 by the symbol $x_3$ have a less important effect on the transmission characteristics of the line than slight changes in the dimension $x_2$ which determines the spacing between individual couplets of insulator beads. This is true because the dimension $x_3$ concerns only the balancing out of higher order reflections. Therefore in manufacturing practice where lines are being made for different apparatus involving several wave lengths within a fairly narrow range, although it is important that the dimension $x_2$ should be adjusted in each case in accordance with the principles above outlined to neutralize reflection at the particular frequency at which the line is designed to serve, nevertheless, the dimension $x_3$ can conveniently be made the same for the lines operating at the several wave lengths in the said range if any manufacturing convenience is achieved by this simplification of line specifications.

By means of the principles above explained transmission lines can be constructed for relatively short wave lengths, such, for instance, as wave lengths of about 10 centimeters in which there is unusually little attenuation and which exhibits the ordinary characteristics of a non-resonant line, such as absence of reflections and a reasonably predictable impedance. When the insulating beads are formed of high quality polystyrene with a thickness of about one-tenth or one-eighth of an inch, the losses in the lines are quite low. The spacing of insulating beads according to the principles of this invention is also useful for fittings adapted to be connected to ultra-high-frequency transmission lines. Thus instead of a single bead, which may produce undesired reflections, the fitting may be provided with a pair of beads spaced in accordance with this invention.

What I desire to claim and secure by Letters Patent is:

1. A transmission for electromagnetic waves of short wave length in which supporting insulators substantially similar to each other are distributed along its length in such a manner that each of said insulators is paired with another and spaced therefrom by a distance $x_2$, measured from the nearer faces of said insulators, said insulators being further arranged so that each such pair thereof in excess of one pair is paired with another pair to form a balanced group of the second order in which the centers of the component pairs are spaced by a distance $$2(x_1+x_2)+\frac{\lambda}{4}$$

and so that each such balanced group of the second order in excess of one such group is paired with another such group to form a balanced group of the third order, the centers of the said second order balanced groups being spaced by a distance $$4(x_1+x_2)+\frac{\lambda}{4}$$

and further so that each balanced group of any particular order higher than the first order in excess of one such group of such order is paired with another such group of the same order to form a balanced group of the next higher order in which the centers of the former groups are spaced by a distance $$n(x_1+x_2)+m\frac{\lambda}{4}$$

the above distances being defined by the following formulae:

$$\tan\alpha_1 \tan\alpha_2 = \frac{2\sqrt{\epsilon}}{1+\epsilon}$$

$$\alpha_1 = \frac{2\pi}{\lambda}x_1\sqrt{\epsilon}$$

$$\alpha_2 = \frac{2\pi}{\lambda}x_2$$

wherein $\lambda$ is the wave length in air corresponding to the frequency for which said line is designed to have optimum transmission characteristics; $x_1$ is the effective axial thickness of an individual insulator; $\epsilon$ is the dielectric constant of the material of which the insulators are made; $n$ is the number of insulators in each of the groups the spacing between which is to be determined, $m$ is an odd integer sufficiently large to prevent said groups from overlapping, $\alpha_1$ is the angular phase shift in radians occurring in the space $x_1$ occupied by an insulator and $\alpha_2$ is the angular phase shift in radians occurring in the space $x_2$ between insulators.

2. A transmission line for electromagnetic waves of short wave lengths in which each supporting insulator is paired with another insulator of similar material, configuration and magnitude and spaced therefrom according to the following formulae:

$$\tan\alpha_1 \tan\alpha_2 = \frac{2\sqrt{\epsilon}}{1+\epsilon}$$

$$\alpha_1 = \frac{2\pi}{\lambda}x_1\sqrt{\epsilon}$$

$$\alpha_2 = \frac{2\pi}{\lambda}x_2$$

wherein $\lambda$ is the wave length in air corresponding to the frequency for which said line is designed to have optimum transmission characteristics, $x_1$ is the mean dimension in the direction of said line of the insulators of the pair in question, $x_2$ is the distance between the said insulators of said pair measured between their respective nearer faces, $\epsilon$ is the dielectric constant of the material of which the said insulators are made, $\alpha_1$ is the angular phase shift in radians occurring in the space $x_1$ occupied by an insulator and $\alpha_2$ is the angular phase shift in radians occurring in the space $x_2$ between insulators.

3. A transmission line for high-frequency alternating currents in which no group of successive insulators spaced at intervals of a quarter wave length or less (said wave length corresponding to the frequency of optimum transmission) numbers more than four insulators and in which line each insulator across the line is paired with another insulator of similar material, configuration and magnitude and spaced therefrom according to the following formulae:

$$\tan\alpha_1 \tan\alpha_2 = \frac{2\sqrt{\epsilon}}{1+\epsilon}$$

$$\alpha_1 = \frac{2\pi}{\lambda}x_1\sqrt{\epsilon}$$

$$\alpha_2 = \frac{2\pi}{\lambda}x_2$$

wherein $\lambda$ is the wave length in air corresponding to the frequency for which said line is designed to have optimum transmission characteristics, $x_1$ is the mean dimension in the direction of said line of each of the insulators of the pair in question, $x_2$ is the distance between the said insulators of said pair measured between their respective nearer faces, $\epsilon$ is the dielectric constant of the material of which the said insulators are made, $\alpha_1$ is the angular phase shift in radians occurring in the space $x_1$ occupied by an insulator, and $\alpha_2$ is the angular phase shift in radians occurring in the space $x_2$ between insulators.

4. A transmission line for high-frequency alternating currents in which the insulators across said line are substantially similar to each other in electric properties and in which said insulators are distributed in groups of two insulators and groups of four insulators such that the spacing between the adjacent faces of different insulators of the same group is defined by a distance $x_2$ and the spacing between different groups of insulators, measured from adjacent faces of adjacent insulators of different groups, is defined by a distance $x_3$, the distances $x_2$ and $x_3$ being determined by the following relations:

$$\tan \alpha_1 \tan \alpha_2 = \frac{2\sqrt{\epsilon}}{1+\epsilon}$$

$$\alpha_1 = \frac{2\pi}{\lambda} x_1 \sqrt{\epsilon}$$

$$\alpha_2 = \frac{2\pi}{\lambda} x_2$$

$$x_3 = x_2 + \frac{\lambda}{4}$$

wherein $\lambda$ is the wave length in air corresponding to the frequency for which the line is designed to have optimum transmission characteristics, $x_1$ is the effective axial thickness of an individual insulator; $\epsilon$ is the dielectric constant of the material of which the insulators are made, $\alpha_1$ is the angular phase shift in radians occurring in the space $x_1$ occupied by an insulator, and $\alpha_2$ is the angular phase shift in radians occurring in the space between insulators.

5. A transmission line for high-frequency alternating currents provided with an even number of electrical discontinuity-producing supports of similar electrical characteristics in which line said discontinuity-producing supports are distributed along the length of said line in such a manner that each of said supports is paired with another and spaced therefrom by a distance $x_2$, measured between adjacent extremities of successive supports, said supports being further arranged so that each such pair thereof in excess of one pair is paired with another pair to form a balanced group of the second order in which the centers of the component pairs are spaced by a distance $$2x_2 + \frac{\lambda}{4}$$

and so that each such balanced group of the second order in excess of one such group is paired with another such group to form a balanced group of the third order, the centers of the said second order balanced group being spaced by a distance $$4x_2 + \frac{\lambda}{4}$$

and further so that each balanced group of any particular order such that the attenuation in the line including such group is less than 3 decibels, in excess of one such group, is paired with another such group of the same order to form a balanced group of the next higher order in which the centers of the former groups are spaced by a distance $$n(x_1 + x_2) + m\frac{\lambda}{4}$$

the above distances being defined by the following formula:

$$\tan \alpha_1 \tan \alpha_2 = \frac{2Z_1 Z_0}{Z_1^2 + Z_0^2}$$

wherein $Z_1$ is the characteristic or surge impedance of the short sections of transmission line at points where the said supports are across the line, $Z_0$ is the characteristic or surge impedance of the transmission line where no supports are across the line, $\alpha_1$ is the angular phase shift occurring in each section of line constituted by the point at which one of said supports is across the line, and is related to the length of such section of line in the well-known manner, $\alpha_2$ is the angular phase shift occurring in the line in the distance $x_2$ between the components of any of said terms of insulator, and is related to the said distance $x_2$ in the well-known manner, $n$ is the number of such supports in each of the groups the spacing between which is to be determined, and $m$ is an odd integer sufficiently large to prevent said groups from overlapping.

6. A transmission line for high-frequency alternating curents having discontinuity-producing structures at various points in said line and in which each of said structures is paired with another of said structures of similar configuration and electrical properties and spaced therefrom according to the following formulae:

$$\tan \alpha_1 \tan \alpha_2 = \frac{2Z_1 Z_0}{Z_1^2 + Z_0^2}$$

$$\alpha_1 = \frac{2\pi}{\lambda} x_1 \frac{Z_1}{Z_0}$$

$$\alpha_2 = \frac{2\pi}{\lambda} x_2$$

wherein $\lambda$ is the wave length in air corresponding to the frequency for which said line is designed to have optimum transmission characteristics, $x_1$ is the length of transmission line involved in each of the discontinuity-producing structures in question, $x_2$ is the length of transmission line between two similar discontinuity-producing structures paired and spaced in the above manner, $Z_1$ is the characteristic or surge impedance of the sections of transmission lines associated with said discontinuity-producing structure, $Z_0$ is the characteristic or surge impedance of the transmission line between said discontinuity-producing structures, $\alpha_1$ is the angular phase shift in radians occurring in the length of transmission line $x_1$ occupied by one of said discontinuity-producing structures, and $\alpha_2$ is the angular phase shift in radians occurring in the length of transmission line $x_2$ between two similar discontinuity-producing structures paired and spaced in the above manner.

7. A transmission line for high-frequency alternating currents in which discontinuity-producing structures are associated with said line at spaced points, said discontinuity-producing structures being substantially similar to each other in electrical properties with respect to said transmission line, and in which said discontinuity-producing structures are distributed along the length of said transmission line in groups of two structures and groups of four structures such that the length of line between the adjacent structures of the same group is defined by a distance $x_2$ and the length of the line between different groups of structures, measured from adjacent structures of different groups, is defined by a distance $x_3$, the distances $x_2$ and $x_3$ being determined by the following relations:

$$\tan \alpha_1 \tan \alpha_2 = \frac{2Z_1 Z_0}{Z_1^2 + Z_0^2}$$

$$\alpha_1 = \frac{2\pi}{\lambda} x_1 \frac{Z_1}{Z_0}$$

$$\alpha_2 = \frac{2\pi}{\lambda} x_2$$

$$x_3 = x_2 + \frac{\lambda}{4}$$

wherein $\lambda$ is the wave length in air corresponding to the frequency for which said line is designed to have optimum transmission characteristics, $x_1$ is the length of transmission line involved in each of the discontinuity-producing structures in question, $x_2$ is the length of transmission line between two similar discontinuity-producing structures paired and spaced in the above manner, $Z_1$ is the characteristic or surge impedance of the sections of transmission line associated with said discontinuity-producing structure, $Z_0$ is the characteristic or surge impedance of the transmission line between said discontinuity-producing structures, $\alpha_1$ is the angular phase shift in radians occurring in the length of transmission line $x_1$ occupied by one of said discontinuity-producing structures, and $\alpha_2$ is the angular phase shift in radians occurring in the length of transmission line $x_2$ between two similar discontinuity-producing structures paired and spaced in the above manner.

8. A transmission line for high-frequency alternating currents of frequencies in the neighborhood of a particular design frequency, said line having a plurality of spacing insulators distributed along its length which are substantially similar to each other and which have an axial dimension very small compared with a quarter wave length corresponding to said design frequency, said insulators being distributed along said line in such a manner that each insulator is paired with another insulator located approximately at a distance of an odd number of electrical quarter wave lengths corresponding to said design frequency, said distance being measured from corresponding parts of said insulators, said insulators being further arranged so that each pair thereof in excess of one pair is paired with another pair to form a balanced group of the second order in which the centers of the component pairs are spaced by an odd number of said quarter wave lengths, and so that each balanced group of the second order in excess of one such balanced group is paired with another group of similar constitution to form a balanced group of the third order, the centers of said second order balanced group being spaced by an odd number of said quarter wave lengths, and so that each balanced group of any particular order such that the attenuator in the line including such group is less than three decibels, in excess of one such group, is paired with another balanced group of the same order to form a balanced group of the next higher order in which said centers of the former groups are spaced by an odd number of said quarter wave lengths.

9. A transmission line for high-frequency alternating currents of frequencies in the neighborhood of a particular design frequency, said transmission line having therein a plurality of spacing insulators substantially similar to each other in electrical properties and of an axial dimension small compared to an electrical quarter wave length corresponding to said design frequency, said insulators being distributed along said line in groups of two insulators and groups of four insulators such that the spacing between corresponding parts of different insulators of the same groups is approximately equal to said quarter wave length and the spacing between different groups of insulators measured from corresponding parts of adjacent insulators of different groups is approximately equal to an electrical half wave length corresponding to said design frequency.

10. A transmission line for high-frequency alternating currents for transmitting a relatively broad band of frequencies of the order of a particular design frequency in which line spacing insulators are distributed in pairs so spaced from each other that reflections and standing waves set up by one component of any of such pairs are practically cancelled by the reflections and standing waves set up by the other components of said pairs, at least for said design frequency, said pairs being further arranged so that the resultant reflections and standing waves produced by any of said pairs at frequencies somewhat differing from said design frequency are negatived to a considerable extent, and to a degree which increases as said last-mentioned frequency approaches said design frequency, by the resultant reflections and standing waves produced by another of said pairs, and in which said pairs and said pairs of pairs are organized into balanced groups of higher order for the purpose of negativing resultant reflections and standing waves in a similar fashion to the extent permitted by the number of the insulators in said line.

11. A transmission line for high-frequency alternating currents of a particular design frequency in which line insulators are distributed in groups of insulators some of which comprise two insulators and others of which groups comprise four insulators, the spacing between insulators being such that reflections and standing waves set up by one insulator will be cancelled to a large extent, at least at said design frequency, by reflections and standing waves set up by another insulator paired with said first-mentioned insulator, said insulators being further spaced so that at a frequency somewhat different from said design frequency, resultant reflections and standing waves set up by insulators paired as aforesaid will, to a degree which increases as said frequency approaches said design frequency, be negatived by the resultant reflection and standing waves set up by another pair of insulators.

12. A transmission line for high-frequency currents of frequencies in the neighborhood of a particular design frequency in which line insulators substantially similar to each other in electrical properties are distributed along the length of said line in accordance with a pattern developed in the following manner:

.O.E.O. .O.E.O. .O.E.O. .O.E.O. .O.E.O. .O.E.O. .O.E.O.
    O         E        O        O        O        E        O .O.E.O. .O.E.O. .O.E.O. .O.E.O. .O.E.O. .O.E.O. .O.E.O.
    E        O        E        O        O        O        E .O.E.O. .O.E.O.
    O wherein a dot (·) represents the presence of an insulator, and the symbols O and E represent spacings between adjacent faces of successive insulators determined in accordance with the following formulae, wherein $x$ represents the axial dimensions of the insulator, $\epsilon$ represents the dielectric constant of the material of which the insulators are made, $\lambda$ represents the wave length corresponding to said design frequency, $\alpha_1$ is the angular phase shift in radians occurring in the space occupied by an insulator, and $\alpha_2$ is the angular phase shift in radians occurring in the above-identified space O between insulators:

$$\tan \alpha_1 \tan \alpha_2 = \frac{2\sqrt{\epsilon}}{1+\epsilon}$$

$$\alpha_1 = \frac{2\pi}{\lambda} x \sqrt{\epsilon}$$

$$\alpha_2 = \frac{2\pi}{\lambda} O$$

$$E = O + \frac{\lambda}{4}$$

13. A transmission line for high-frequency currents of frequencies in the neighborhood of a particular design frequency in which line discontinuity-producing support structures substantially similar to each other in electrical properties are distributed along the length of said line in accordance with a pattern developed in the following manner:

.O.E.O. .O.E.O. .O.E.O. .O.E.O.:.O.E.O. .O.E.O. .O.E.O.
    O     E     O     O     O     E     O
.O.E.O.:.O.E.O. .O.E.O. .O.E.O. .O.E.O.:.O.E.O. .O.E.O.
    E     O     E     O     O     O     E
.O.E.O. .O.E.O.
    O wherein a dot (.) represents the presence of one of said support structures, and the symbols O and E represent spacings between adjacent faces of successive discontinuity-producing support structures determined in accordance with the following formulae, wherein $Z_1$ is the characteristic or surge impedance of the short sections of transmission line at points where the said support structures are across the line, $Z_0$ is the characteristic or surge impedance of the transmission line where no support structures are across the line, $\lambda$ represents the wave length corresponding to said design frequency, $\alpha_1$ is the angular phase shift in radians occurring in the space occupied by a support structure, and $\alpha_2$ is the angular phase shift in radians occurring in the above-identified space O between successive support structures:

$$\tan \alpha_1 \tan \alpha_2 = \frac{2 Z_1 Z_0}{Z_1^2 + Z_0^2}$$

$$\alpha_1 = \frac{2\pi Z_1}{\lambda Z_0}$$

$$\alpha_2 = \frac{2\pi}{\lambda} O$$

$$E = O + \frac{\lambda}{4}$$

14. A transmission line for high-frequency currents of frequencies in the neighborhood of a particular design frequency in which line insulators substantially similar to each other in electrical properties and having an axial dimension less than 3 per cent of the wave length in air corresponding to said design frequency are distributed along the length of said line in accordance with a pattern developed in the following manner:

.O.E.O. .O.E.O. .O.E.O. .O.E.O.:.O.E.O. .O.E.O. .O.E.O.
    O     E     O     O     O     E     O
.O.E.O.:.O.E.O. .O.E.O. .O.E.O. .O.E.O.:.O.E.O. .O.E.O.
    E     O     E     O     O     O     E
.O.E.O. .O.E.O.
    O wherein a dot (·) represents the presence of an insulator, and the symbols O and E represent spacings between centers of successive insulators respectively equal to one-quarter and one-half of said wave length.

15. A transmission line for high-frequency alternating currents for a band of frequencies including a particular design frequency in which line a plurality of insulators substantially similar to each other in electrical properties are distributed along the length of said line in groups, some of which groups comprise two insulators and others of which comprise four insulators, in accordance with the following pattern:

2422444224224224422444224442244422422422444224224
2244422422422444224442244422422422444224224442242

The above pattern of numbers indicating the sequence of two-member and four-member groups, the spacing between the insulators in the same group being defined by a distance $x_2$ and the spacing between adjacent insulators in different groups being defined by a distance $x_3$, both said distances being measured between the nearer spaces of successive insulators and being defined by the following relations:

$$\tan \alpha_1 \tan \alpha_2 = \frac{2\sqrt{\epsilon}}{1+\epsilon}$$

$$\alpha_1 = \frac{2\pi}{\lambda} x_1 \sqrt{\epsilon}$$

$$\alpha_2 = \frac{2\pi}{\lambda} x_2$$

$$x_3 = x_2 + \frac{\lambda}{4}$$

wherein $\lambda$ is the wave length in air corresponding to the frequency for which the line is designed to have optimum transmission characteristics; $x_1$ is the effective axial thickness of an individual insulator; $\epsilon$ is the dielectric constant of the material of which the insulators are made; $\alpha_1$ is the angular phase shift in radians occurring in space $x_1$ occupied by an insulator, and $\alpha_2$ is the angular phase shift in radians occurring in the space $x_2$ above defined.

16. A transmission line of the coaxial conductor type having an inner conductor and a cylindrical outer conductor coaxial therewith and having insulators substantially similar to each other in electric properties supporting said inner conductor relative to said outer conductor, being distributed in said line in groups of two insulators and groups of four insulators such that the spacing between the adjacent faces of different insulators of the same group is defined by a distance $x_2$ and the spacing between different groups of insulators, measured from adjacent faces of adjacent insulators of different groups, is defined by a distance $x_3$, the distances $x_2$ and $x_3$ being determined by the following relations:

$$\tan \alpha_1 \tan \alpha_2 = \frac{2\sqrt{\epsilon}}{1+\epsilon}$$

$$\alpha_1 = \frac{2\pi}{\lambda} x_1 \sqrt{\epsilon}$$

$$\alpha_2 = \frac{2\pi}{\lambda} x_2$$

$$X_3 = x_2 + \frac{\lambda}{4}$$

wherein $\lambda$ is the wave length in air corresponding to the frequency for which the line is designed to have optimum transmission characteristics; $x_1$ is the effective axial thickness of the individual insulators; $\epsilon$ is the dielectric constant of the material of which the insulators are made; $\alpha_1$ is the angular phase shift in the radians occurring in space $x_1$ occupied by an insulator, and $\alpha_2$ is the angular phase shift in radians occurring in the space $x_2$ above defined.

17. A transmission line of the coaxial conductor type having an inner conductor and a cylindrical outer conductor in which line discontinuity-producing supports are located within said outer conductor at spaced points, said discontinuity-producing structures being substantially similar to each other in electrical properties with respect to said transmission line, and in which line said discontinuity-producing structures are distributed along the length of said transmission line in groups of two structures and groups of four structures such that the length of line between the adjacent structures of the same group is defined by a distance $x_2$ and the length of line between different groups of structures, measured from adjacent structures of different groups, is defined by a distance $x_3$, the distances $x_2$ and $x_3$ being determined by the following relation:

$$\tan \alpha_1 \tan \alpha_2 = \frac{2 Z_1 Z_0}{Z_1^2 + Z_0^2}$$

$$\alpha_1 = \frac{2\pi}{\lambda} x_1 \frac{Z_1}{Z_0}$$

$$\alpha_2 = \frac{2\pi}{\lambda} x_2$$

$$X_3 = x_2 + \frac{\lambda}{4}$$

wherein $\lambda$ is the wave length in air corresponding to the frequency for which said line is designed to have optimum transmission characteristics, $x_1$ is the length of transmission line involved in each of the discontinuity-producing structures in question, $x_2$ is the length of transmission line between two similar discontinuity-producing structures paired and spaced in the above manner, $Z_1$ is the characteristic or surge impedance of the sections of transmission line associated with said discontinuity-producing structure, $Z_0$ is the characteristic or surge impedance of the transmission line between said discontinuity-producing structure, $\alpha_1$ is the angular phase shift in the radians occurring in space $x_1$ above defined, and $\alpha_2$ is the angular phase shift in radians occurring in the space $x_2$ above defined.

18. A transmission line of the coaxial conductor type for frequencies in the neighborhood of a particular design frequency, said transmisison line having an inner conductor, a cylindrical outer conductor coaxial with said inner conductor, and having within said outer conductor a plurality of spacing insulators substantially similar to each other in electrical properties and of an axial dimension small compared to an electrical quarter wave length corresponding to said design frequency, said insulators serving to support said inner conductor relative to said outer conductor being distributed along said line in groups of two insulators and groups of four insulators such that the spacing between corresponding parts of different insulators of the same groups is approximately equal to said quarter wave length and the spacing between different groups of insulators measured from corresponding parts of adjacent insulators of different groups is approximately equal to an electric half wave length corresponding to said design frequency.

JAMES L. LAWSON.

REFERENCES CITED

The following references are of record in the file of this patent:

UNITED STATES PATENTS

| Number | Name | Date |
|---|---|---|
| 2,165,961 | Cork | July 11, 1939 |
| 2,269,991 | Scheldorf | Jan. 13, 1942 |